(12) United States Patent
Martick

(10) Patent No.: US 11,709,691 B2
(45) Date of Patent: Jul. 25, 2023

(54) SOFTWARE USER ASSISTANCE THROUGH IMAGE PROCESSING

(71) Applicant: SAP SE, Walldorf (DE)

(72) Inventor: Christian Martick, Wendisch Rietz (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/464,540

(22) Filed: Sep. 1, 2021

(65) Prior Publication Data

US 2023/0063759 A1    Mar. 2, 2023

(51) Int. Cl.
*G06F 9/451* (2018.01)
*G06V 30/14* (2022.01)

(52) U.S. Cl.
CPC .......... *G06F 9/453* (2018.02); *G06V 30/1448* (2022.01)

(58) Field of Classification Search
CPC ....... G06F 9/453; G06V 10/225; G06V 30/10
See application file for complete search history.

(56) References Cited

U.S. PATENT DOCUMENTS

| | | | | |
|---|---|---|---|---|
| 9,582,482 B1* | 2/2017 | Sharifi | ................. | G06F 16/5866 |
| 9,886,461 B1* | 2/2018 | Sharifi | .................. | G06F 40/295 |
| 9,916,328 B1* | 3/2018 | Sharifi | .................. | G06F 16/583 |
| 10,372,761 B2* | 8/2019 | He | ....................... | G06F 16/9024 |
| 10,540,661 B2* | 1/2020 | Lange | ................. | G06F 3/04817 |
| 10,726,630 B1* | 7/2020 | Duckworth | ............. | G06T 15/50 |
| 10,740,121 B2* | 8/2020 | Jann | ...................... | G06F 3/0485 |
| 10,922,665 B2* | 2/2021 | Miller | .................. | G06V 30/413 |
| 11,106,934 B2* | 8/2021 | Kumar | .................. | G06T 1/0014 |
| 11,165,726 B2* | 11/2021 | Nair | ...................... | H04L 51/046 |
| 11,281,569 B2* | 3/2022 | Raj | ...................... | G06F 11/3688 |
| 11,288,064 B1* | 3/2022 | Monakova | .......... | G06F 9/45512 |
| 11,574,470 B2* | 2/2023 | Anorga | .................. | G06V 20/30 |
| 2016/0055246 A1* | 2/2016 | Marcin | .............. | G06F 16/9535 707/732 |
| 2016/0321052 A1* | 11/2016 | Sharifi | ............. | H04M 1/72406 |
| 2017/0098159 A1* | 4/2017 | Sharifi | ................. | G06F 3/0481 |
| 2017/0118576 A1* | 4/2017 | Sharifi | ................. | G06F 16/587 |
| 2018/0139507 A1* | 5/2018 | Toksoz | ................. | A63F 13/355 |
| 2019/0079787 A1* | 3/2019 | Toksoz | .................... | G06F 9/485 |

(Continued)

*Primary Examiner* — Tadesse Hailu
(74) *Attorney, Agent, or Firm* — Fountainhead Law Group P.C.

(57) ABSTRACT

Software User Assistance (UA) is afforded from captured User Interface (UI) screen images, with reference to persisted Machine Learning (ML) models. The captured screen images are processed—e.g., using rasterization, Optical Character Recognition (OCR), and/or establishment of a coordinate system—with individual UI elements being determined therefrom. Referencing the persisted ML models, the software application/application state for the captured image is identified. UA data relevant to that application/application state is generated from the model, and then provided to the user (e.g., in a text box overlying the UI screen). Through the capture and processing of UI screen images, embodiments afford a homogenous UA experience for installation, maintenance, and/or upgrade of heterogeneous members of a larger overall landscape, over software lifecycles. Embodiments may be deployed locally on a frontend computer, in order to avoid exporting UI images due to privacy and/or security concerns.

20 Claims, 14 Drawing Sheets

(56) References Cited

U.S. PATENT DOCUMENTS

| | | | |
|---|---|---|---|
| 2020/0103978 A1* | 4/2020 | Mixter | G06K 9/6267 |
| 2020/0175404 A1* | 6/2020 | Selvanayagam | G06F 9/451 |
| 2021/0142059 A1* | 5/2021 | Lee | G06K 9/6256 |
| 2021/0166477 A1* | 6/2021 | Bunkasem | G06V 10/776 |
| 2021/0225052 A1* | 7/2021 | Marzorati | G16H 20/60 |
| 2022/0172063 A1* | 6/2022 | Decrop | G06N 3/084 |

\* cited by examiner

FIG. 9B

SOFTWARE USER ASSISTANCE THROUGH IMAGE PROCESSING

BACKGROUND

Unless otherwise indicated herein, the approaches described in this section are not prior art to the claims in this application and are not admitted to be prior art by inclusion in this section.

Current software landscapes may involve the installation, maintenance, operation, upgrading, and addition of many different components, each having their own lifecycles. Such components can encompass technologies spanning many different infrastructures, tools, and processes. For example, on-premise software may be connected to remote cloud products; systems may be provisioned in mostly virtualized environments.

The different components may come with different levels of user interfaces. For example, command line tools may call for specific user knowledge regarding syntax. Browser-based UIs may be more user-friendly, but diverge on different sets of front-ends (e.g., available from different vendors). Such heterogeneity of landscape components can render system installation, maintenance, and/or operation over lengthy software lifecycles, both time-consuming and expensive.

SUMMARY

Software User Assistance (UA) is afforded from captured User Interface (UI) screen images, with reference to persisted Machine Learning (ML) models. The captured screen images are processed—e.g., using rasterization, Optical Character Recognition (OCR), and/or establishment of a coordinate system—with individual UI elements being determined therefrom. Referencing the persisted ML models, the software application/application state for the captured image is identified. UA data relevant to that application/application state is generated from the model, and then provided to the user (e.g., in a text box overlying the UI screen). Through the capture and processing of UI screen images, embodiments afford a homogenous UA experience for installation, maintenance, and/or upgrade of heterogeneous members of a larger overall landscape, over software lifecycles. Embodiments may be deployed locally on a frontend computer, in order to avoid exporting UI images due to privacy and/or security concerns. Embodiments may provide UA for administrative processes spanning across multiple systems and multiple landscapes.

The following detailed description and accompanying drawings provide a better understanding of the nature and advantages of various embodiments.

BRIEF DESCRIPTION OF THE DRAWINGS

FIG. 9B shows a screen shot of yet another user interface for a third system.

DETAILED DESCRIPTION

Described herein are methods and apparatuses that implement software landscape maintenance. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
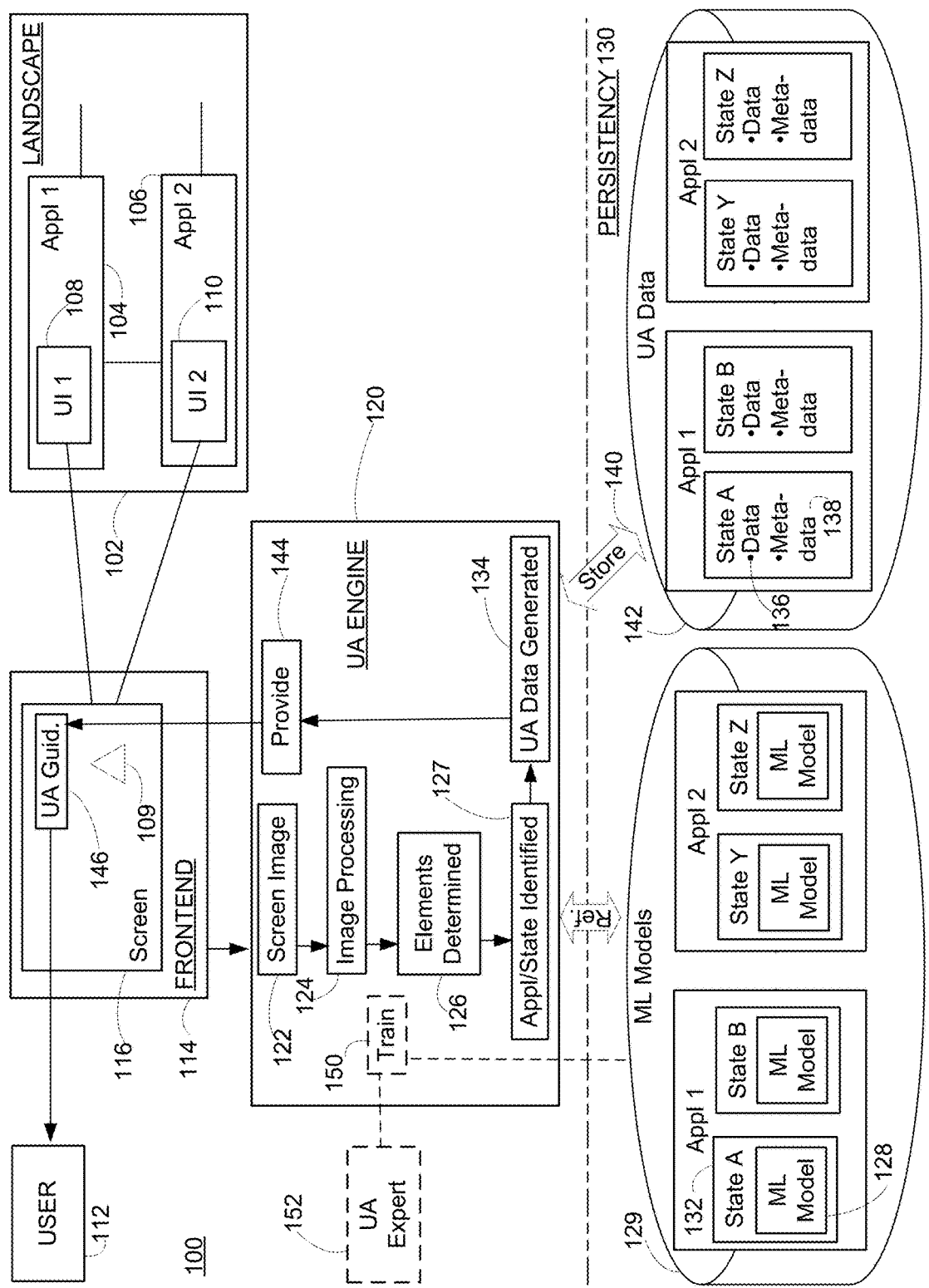
FIG. 1 shows a simplified diagram of a system according to an embodiment.

FIG. 1 shows a simplified view of an example system that is configured to implement user assistance according to an embodiment. System 100 comprises a software landscape 102 comprising a first application 104 and a second application 106 that are each implicated in a single end-to-end process.

The first application includes a first user interface 108 having particular visual elements 109. The second application includes a second user interface 110 having different visual elements.

A user 112 seeks to interact with the first UI and the second UI over a frontend computer 114 in order to perform installation, maintenance, and/or upgrade activities over the lifecycle of the entire landscape. The screen 116 of the frontend computer is configured to display various visual elements.

In order to provide assistance to the user, the UA engine 120 receives a captured image 122 from the screen. Next, the engine subjects the image to processing 124, e.g., rasterization, Optical Character Recognition (OCR), and/or mapping of coordinate axes.

Then, the UA engine determines 126 the identity of the software application whose user interface is being displayed on the screen, based upon one or more elements recognized from the processed image. Such elements can include, but are not limited to:

icons
words
word groups
colors formatting (e.g., indentations, arrangements, character fonts)

The engine next identifies 127 the software application with reference to the elements and one or more Machine Learning (ML) models 128. These models are stored in a non-transitory computer readable storage medium 129 that is part of an underlying persistency 130.

Not only the identity of the software application, but also the state 132 of that application may be determined from the elements and the ML models. In particular, a ML model may be specific to particular application state(s) (e.g., launch; error; queue states).

Based upon the elements, the software application, and the ML model, the engine then generates 134 relevant UA data and metadata. That UA data 136 and metadata 138 is stored 140 in an underlying persistency 142 according to an application-application state specific schema.

The UA data may comprise guidance relevant to the particular application-application state. Next, the engine provides 144 the UA data for display as guidance 146 to the user, e.g., in a text box overlying the UI screen.

With this guidance in hand, the user is better equipped to perform the necessary installation, maintenance, and/or upgrade activities, across the entire landscape. In particular, the ML models may not be limited to providing knowledge regarding one particular application/application state.

That is, during a design time the ML Models may be created and trained 150 based upon knowledge of a UA expert 152. Thus, the ML model(s) may be encoded/trained to recognize UA issues arising across landscape members.

For example, through experience a UA expert may know that under certain circumstances, a launch state of one application may be related to an error state of a different application residing within the same landscape. Thus, the UA afforded by embodiments may offer valuable guidance to the user across heterogenous UIs of different landscape members.

Figure 2:
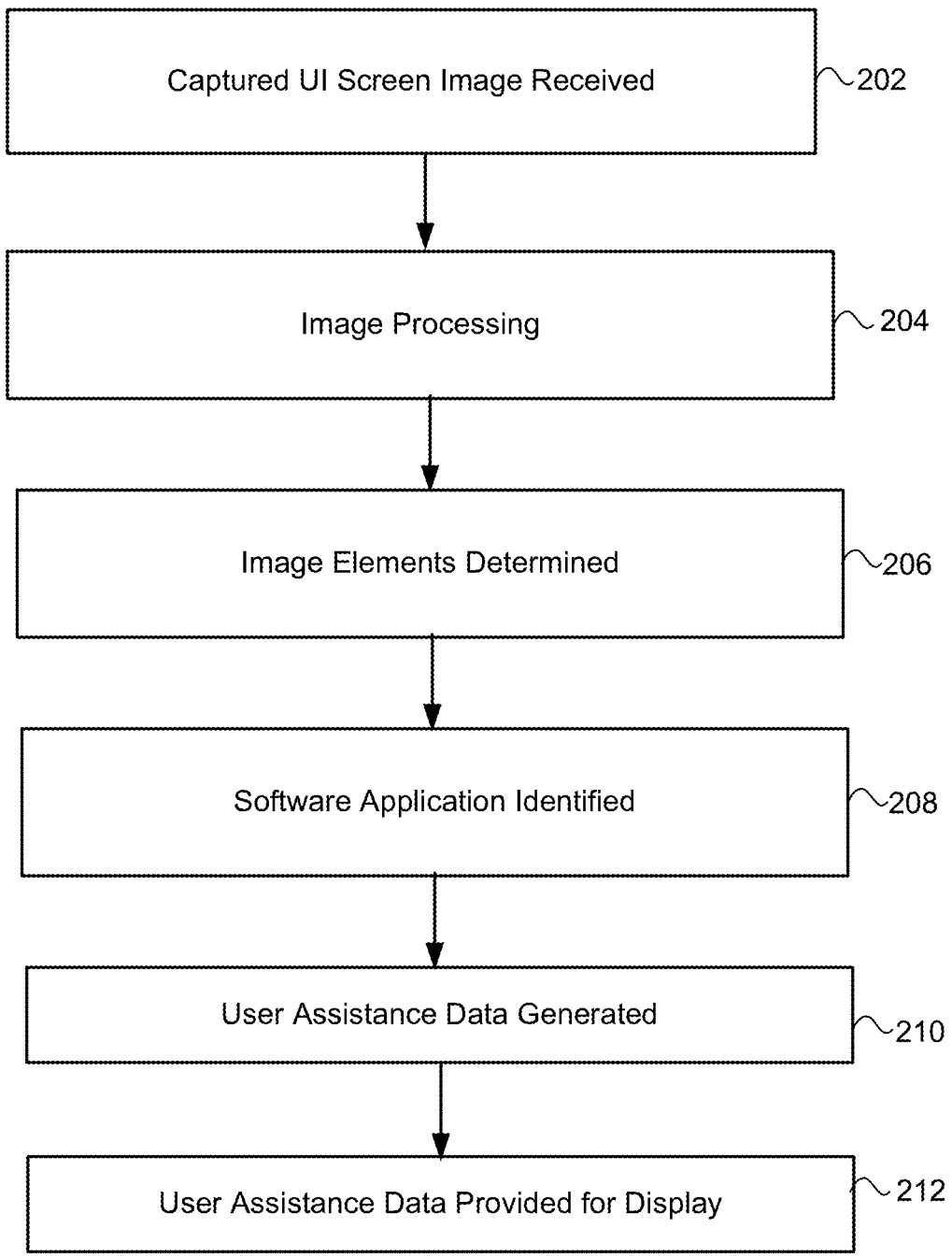
FIG. 2 shows a simplified flow diagram of a method according to an embodiment.

FIG. 2 is a flow diagram of a method 200 according to an embodiment. At 202, a captured image of a UI screen is received.

At 204, the image is subjected to image processing. At 206, elements of the processed image are determined.

At 208, the specific software application of the UI for the image, is identified. At 210, UA data relevant to that software application/application state is generated and stored.

At 212, the UA data is read and provided for display.

Further details regarding user assistance according to various embodiments, are now provided in connection with the following example.

EXAMPLE

Figure 3:
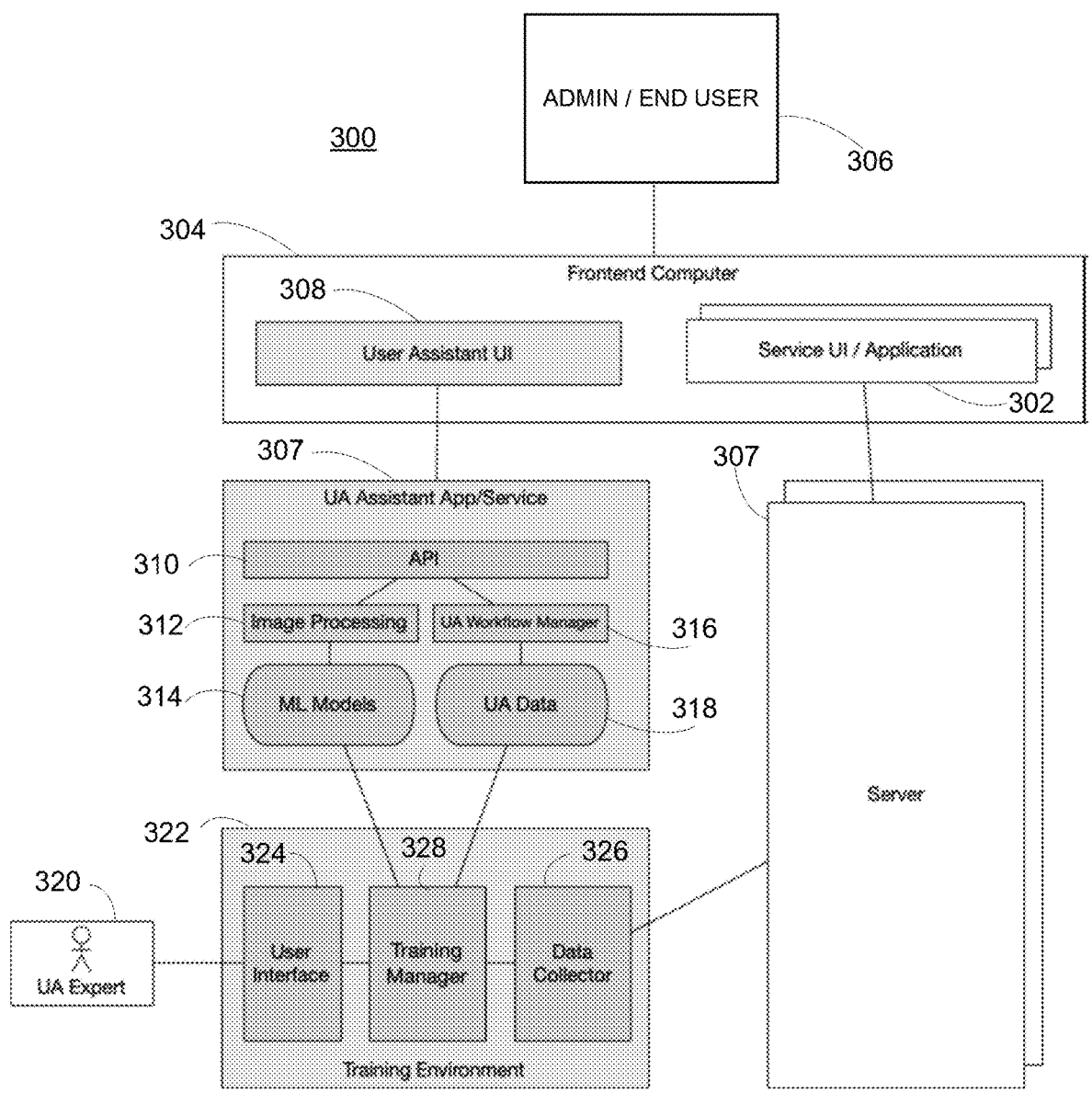
FIG. 3 shows a simplified block diagram of an embodiment of one system according to an exemplary embodiment.

FIG. 3 shows a simplified view of an environment 300 for implementing UA in managing a software landscape according to an embodiment. Specifically, a variety of applications 302 will run on the local frontend computer 304. The applications allow the user 306 to access different components of a software program or larger software landscape—e.g., services and tools running on an infrastructure comprising central server(s) 307.

Under these circumstances successfully operating multiple tools to achieve a defined goal, may call for knowledge concerning one or more of:
each particular tool (including specific states of that tool);
the end-to-end process for securing the goal; and
how and when to utilize each tool.

In particular, the user seeks to performing tasks called for by the end-to-end use case, leveraging native applications and service UIs.

In order to aid the user in this effort, a lightweight UA application 307 is deployed. As shown in FIG. 3, according to some embodiments that UA application may include a UI 308 at the frontend, with other elements located centrally on a remote infrastructure. Such a configuration may be useful where communication bandwidth is not an issue, and ML models for providing the UA are updated frequently.

According to some embodiments, the UA application can be a service. This can be useful to leverage already-existing capacities for procedures such as image processing (e.g., rasterization) and other tasks—e.g., Optical Character Recognition.

According to other embodiments, the UA application may be located entirely locally at the frontend. Such a configuration may be useful where privacy and/or security concerns dictate that captured images are not communicated outside of the frontend.

The UA application captures the frontend computer screen as a digital image via an Application Programming Interface (API) 310. The image processing component 312 prepares the respective image data for consumption by ML model(s) 314. A ML model deploys an appropriate model for image classification, in order to map an entry from the ML model to the just-captured screen image.

Based on the result, the UA workflow manager 316 retrieves the relevant UA data elements 318 and provides those back to the UA application. There, the UA data elements are displayed to the user by the UI.

The capture/classification/UA presentation process may be performed on a continuous basis. This allows the user to receive the relevant information with respect to the current process and tool context.

ML Models and UA Data entries are maintained during design-time by a UA expert 320. Leveraging the training environment 322, a specialized user interface 324 provides the expert with the option to run the apps as the admin would, capturing training data via the data collector 326 and maintaining UA-specific information.

The training manager 328 combines these pieces of data and stores the results in the respective ML Models and UA Data persistencies. Both will be accessed during runtime.

The data models deployed for image classification and UA content are now described. The UA application may include persistencies for ML model data and for UA relevant information.

Figure 4:
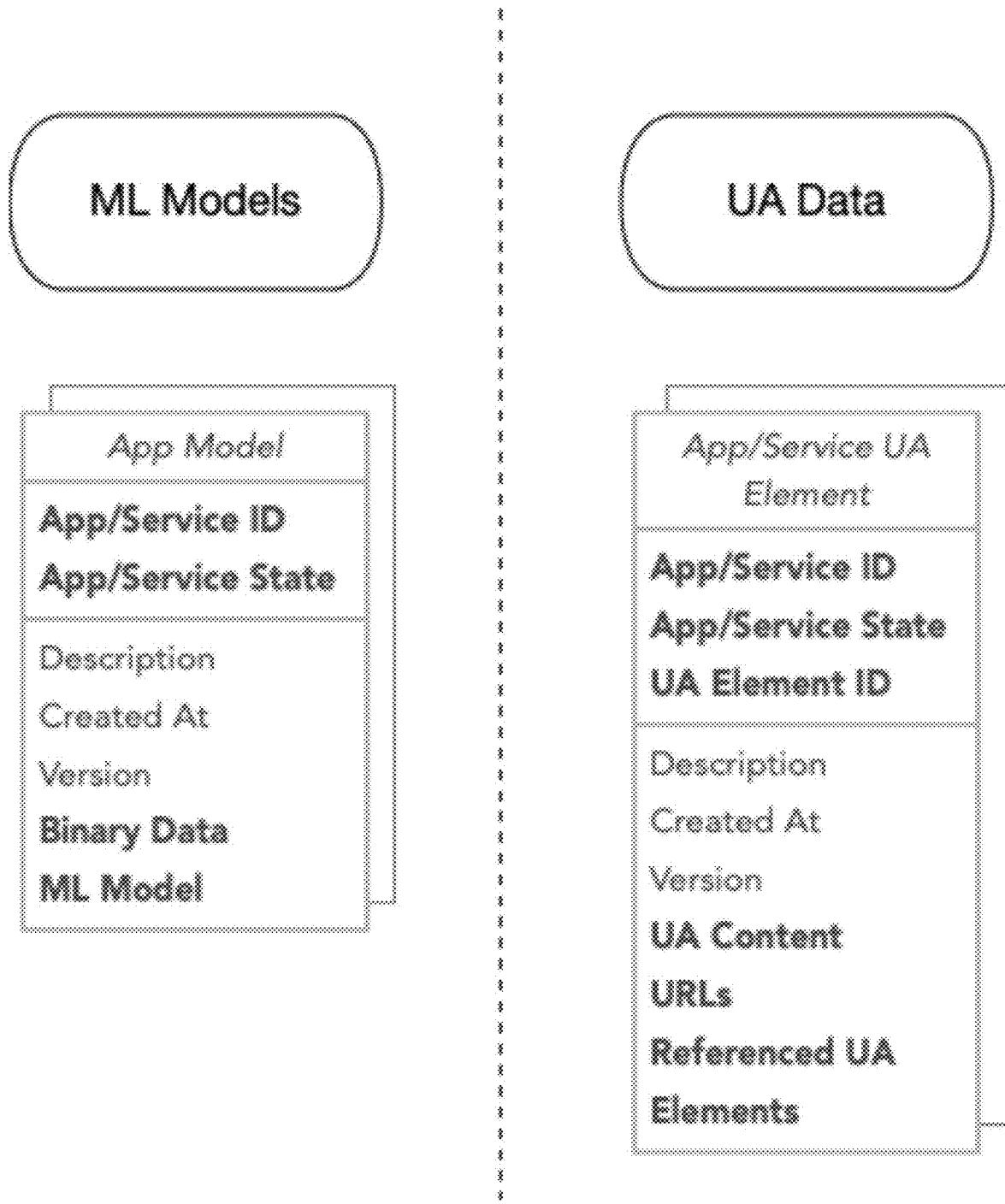
FIG. 4 is a simplified diagram illustrating persistency for one embodiment.

The pieces of data that are stored are depicted in FIG. 4. During design time, data is propagated for both models when the UA expert designer builds the respective UA content and trains the UA application.

Information to perform image classification is stored as part of the ML Model component. This includes unique identifiers such as App/Service ID and State, and meta information like Description, modification dates, and version numbers.

The machine learning model itself is also persisted, in addition to any other required binary data (e.g. screenshots).

Based on the identifying IDs/state, UA data can be maintained. Each element is identifiable by the App/Service ID, State, and the UA Element ID. In this way, a UA element can be referenced back to the application/service context to which it belongs.

In addition to the meta data (such as description, dates, and a version number), actual UA content is also stored. Such content can include descriptive texts, images, and other data.

UA entities link to external resources via URLs. Such external resources can include but are not limited to, help pages and/or websites. If any other UA elements might be related, those can also be stored as referenced UA elements. Embodiments may allow stored data and metadata to be leveraged to present context and relevant feedback to the end user.

Figure 5:
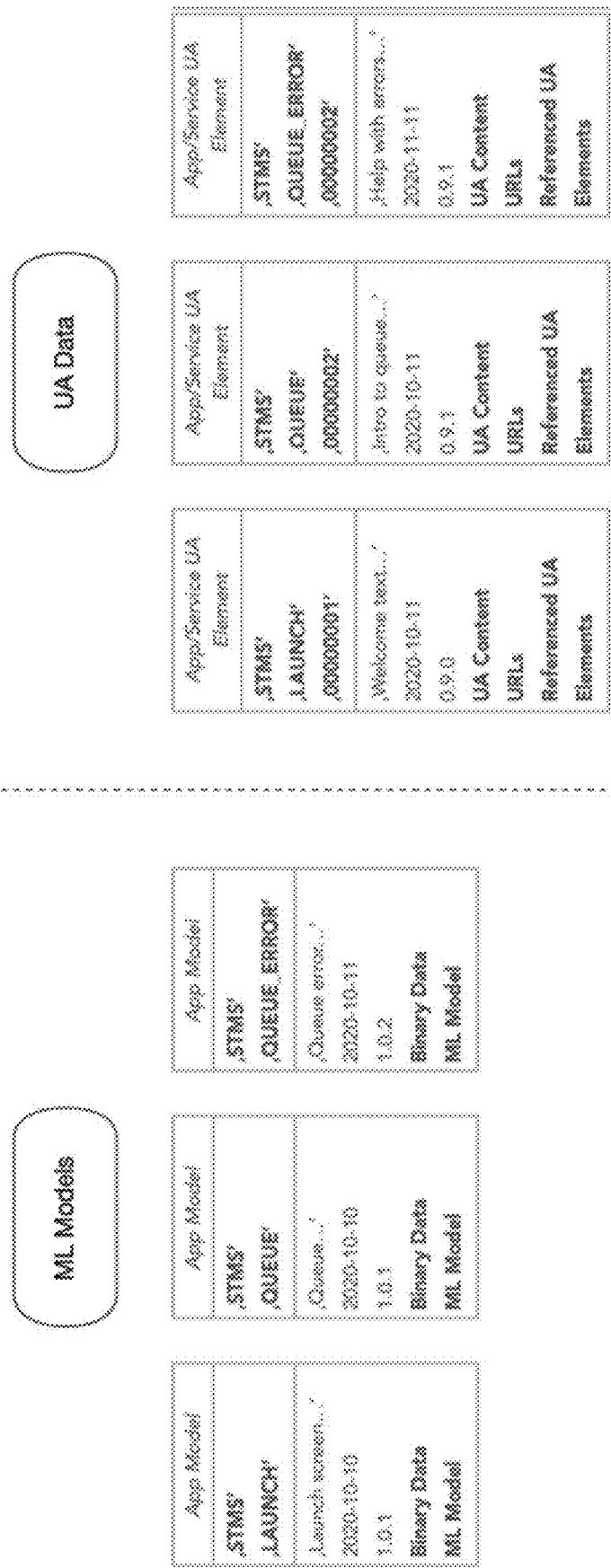
FIG. 5 is a simplified diagram showing details of the persistency of FIG. 4.

Consider the following simple example illustrated in FIG. 5. The App/Service ID uniquely identifies the SAP Transport Management System (STMS) available from SAP SE of Walldorf, Germany. Here, the ID would be,STMS'.

For various states of the STMS application, different state IDs may be defined, e.g.:
1. Launch screen—State=,LAUNCH'
2. Import queue screen—State=,QUEUE'
3. Error in queue screen—State=,QUEUE ERROR'

Each of those application/state combinations form a unique application model instance. That instance includes a specific ML model which could (but is not required to be) shared between the different instances.

It is emphasized that UA modeling is not limited to the application/service level. Rather, modeling can extend to individual states within those applications/services.

That is, embodiments may provide specific guidance and responses as long as those states are visually identifiable based upon the captured screen shots. For example, in the event of an error, example guidance could be a suggestion for a next recommended action to be taken by a user. Example responses could comprise the generation and broadcast of alerts to a support team.

As mentioned above, embodiments utilize a design-time process for training and maintaining UA data, in addition to the actual end-user runtime. UA process flows are now illustrated in connection with FIGS. 6A-B (design-time) and 7A-B (runtime).

Figure 6A:
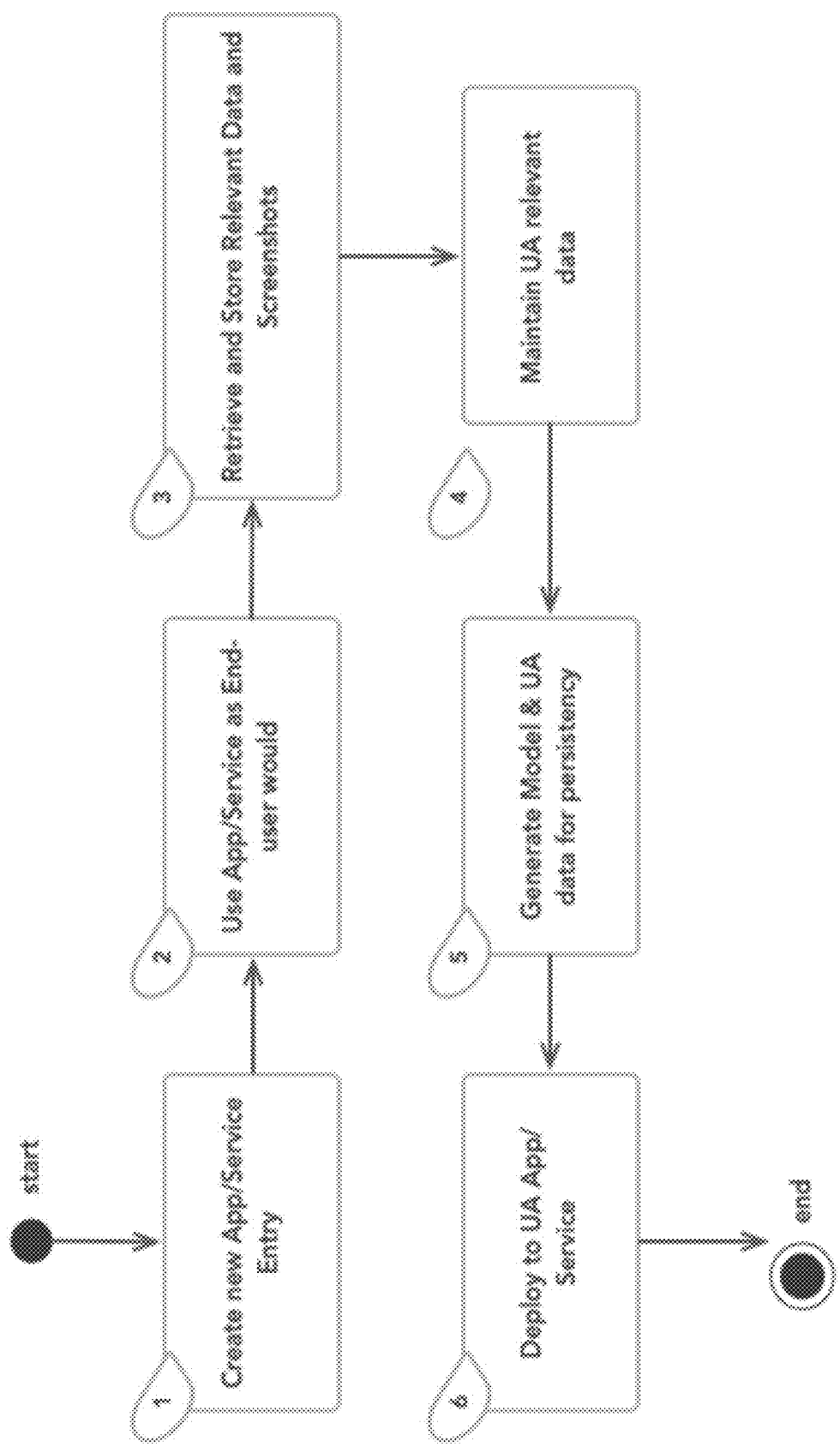
FIG. 6A is a simplified block diagram illustrating a design-time process flow according to an exemplary embodiment.
Figure 6B:
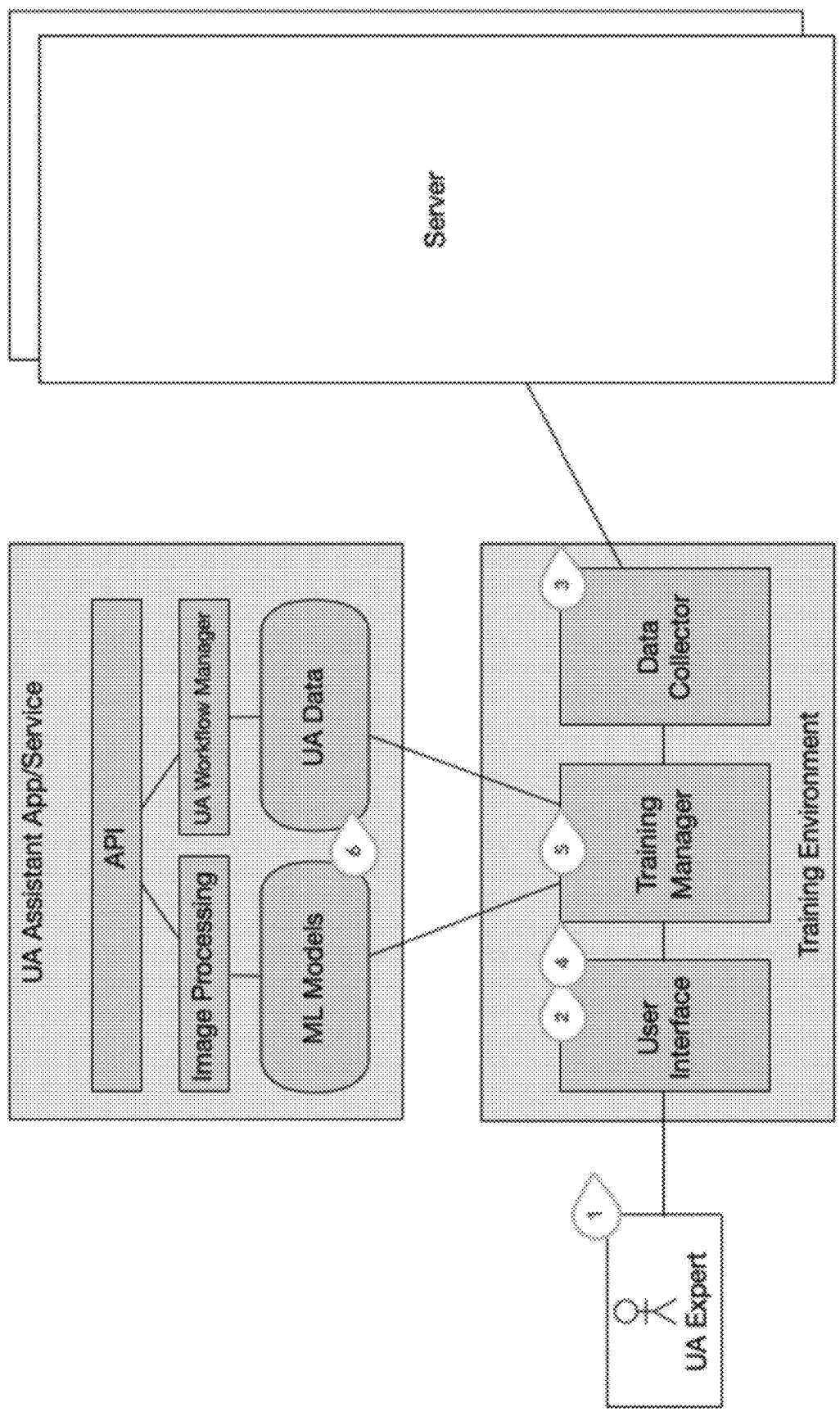
FIG. 6B shows a simplified block diagram illustrating performance of the design-time performance of FIG. 6A by various system elements.

As illustrated in the design-time process flow of FIG. 6A and simplified block diagram of FIG. 6B, at (1) a UA expert can maintain a new application/service entry using the training environments user interface. For training the image classification models, at (2) the expert will then utilize the actual app or service, as any end user would.

At (3) the data collector will consistently capture the computer screen and supply the image data to the training manager for temporary storage. In parallel, at (4) the expert can maintain the UA relevant data.

At (5), based upon image data and the data maintained by the UA expert, the ML model for the image classification will be generated. At (6), that ML model will be deployed to the respective storages of the application.

Figure 7A:
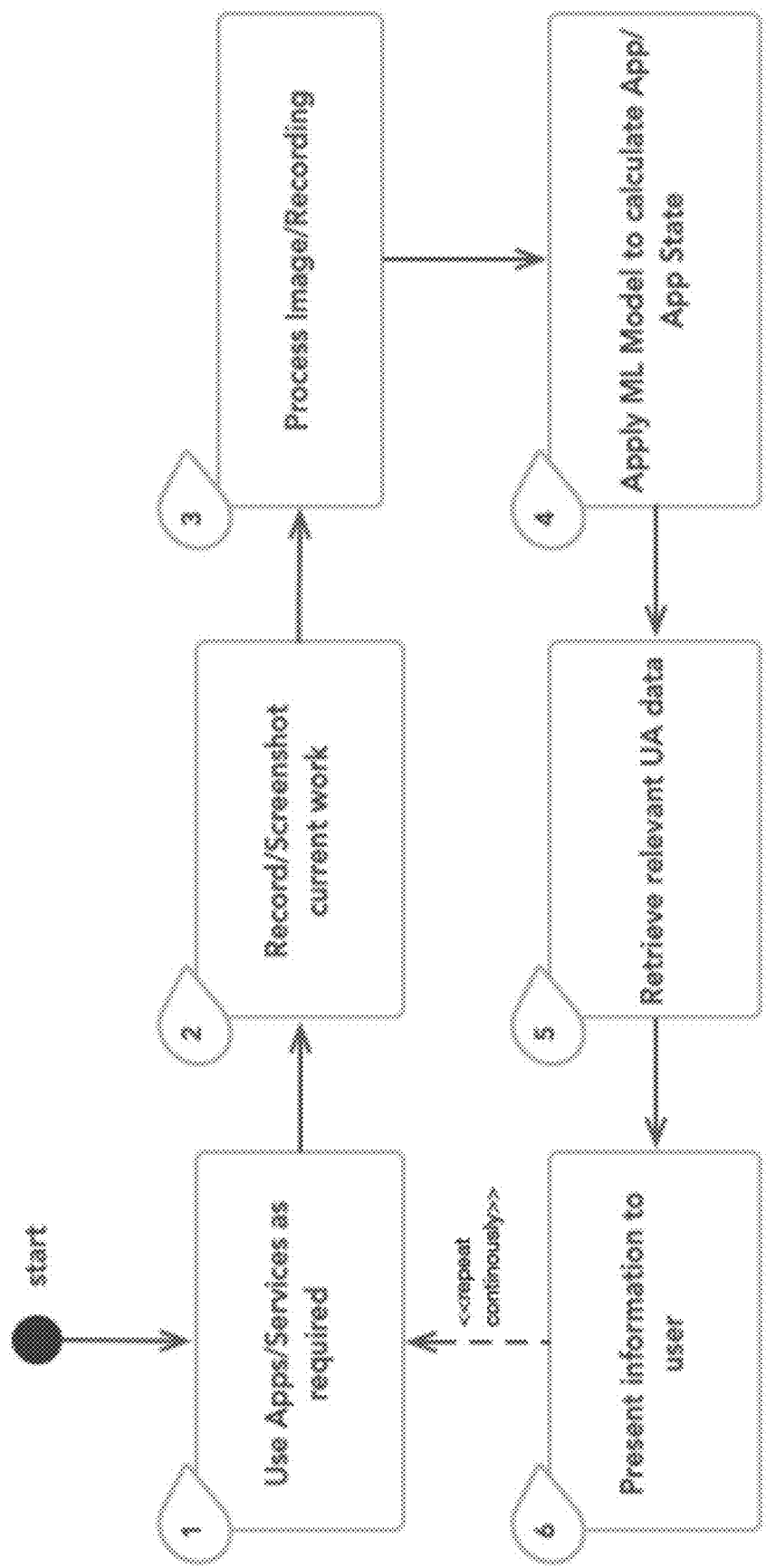
FIG. 7A is a simplified block diagram illustrating a runtime process flow according to an exemplary embodiment.
Figure 7B:
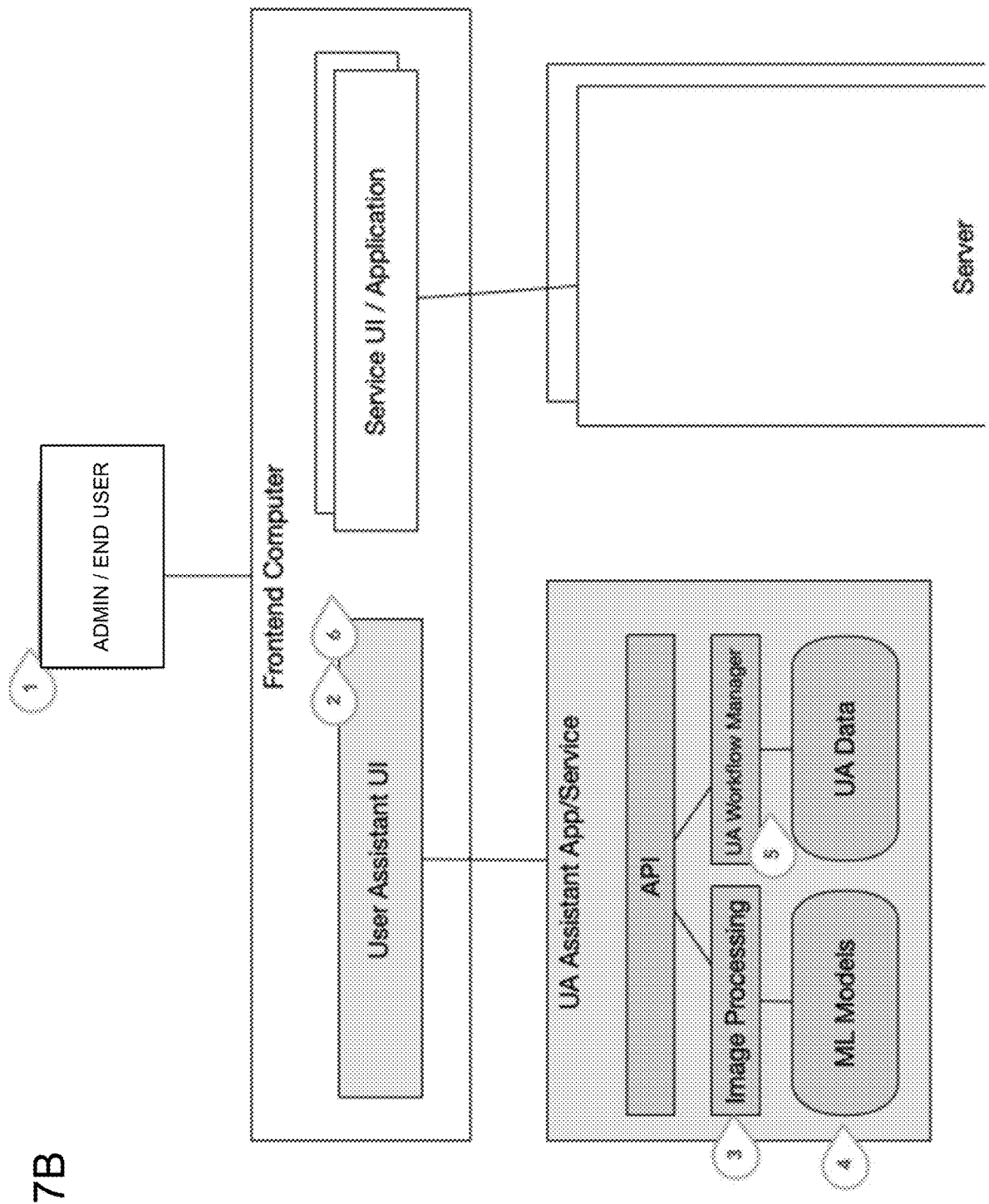
FIG. 7B shows a simplified block diagram illustrating performance of the runtime performance of FIG. 7A by various system elements.

Runtime is now discussed in connection with the simplified process flow of FIG. 7A, and the block diagram of FIG. 7B. Once the respective data for any application is maintained, at (1) the end user can perform actions as required within that application.

At (2), the UA application will consistently capture the screen. At (3), the UA application will perform image processing with that data.

At (4), classification based on the ML Models can be performed. If a relevant application/service and/or state is found, at (5) the respective UA data is retrieved.

Then, at (6) the UA data is presented to the end user for further reference.

Where the UA application is deployed entirety on the frontend, data relevant to security and/or privacy concerns will not leave the frontend computer. Such a local configuration may be further desirable in situations where the infrastructure may not require frequent central machine learning.

One particular embodiment is now discussed. In this particular scenario, an administrative user needs to:
1) start at a terminal, a SAP S/4 HANA in-memory database system available from SAP SE,
2) check remote destinations, and
3) trigger a software deployment using Transport Management System (TMS).

Accordingly, this example was deployed in an implementation of this simple process involving three different tools:
Terminal—command-line based interface for starting a SAP system (e.g., SAP S/4 HANA);
SM59— a native application from SAP SE for accessing remote systems;
SAP Transport Management System (STMS)— a native SAP application for triggering a software deployment.

Figure 8:
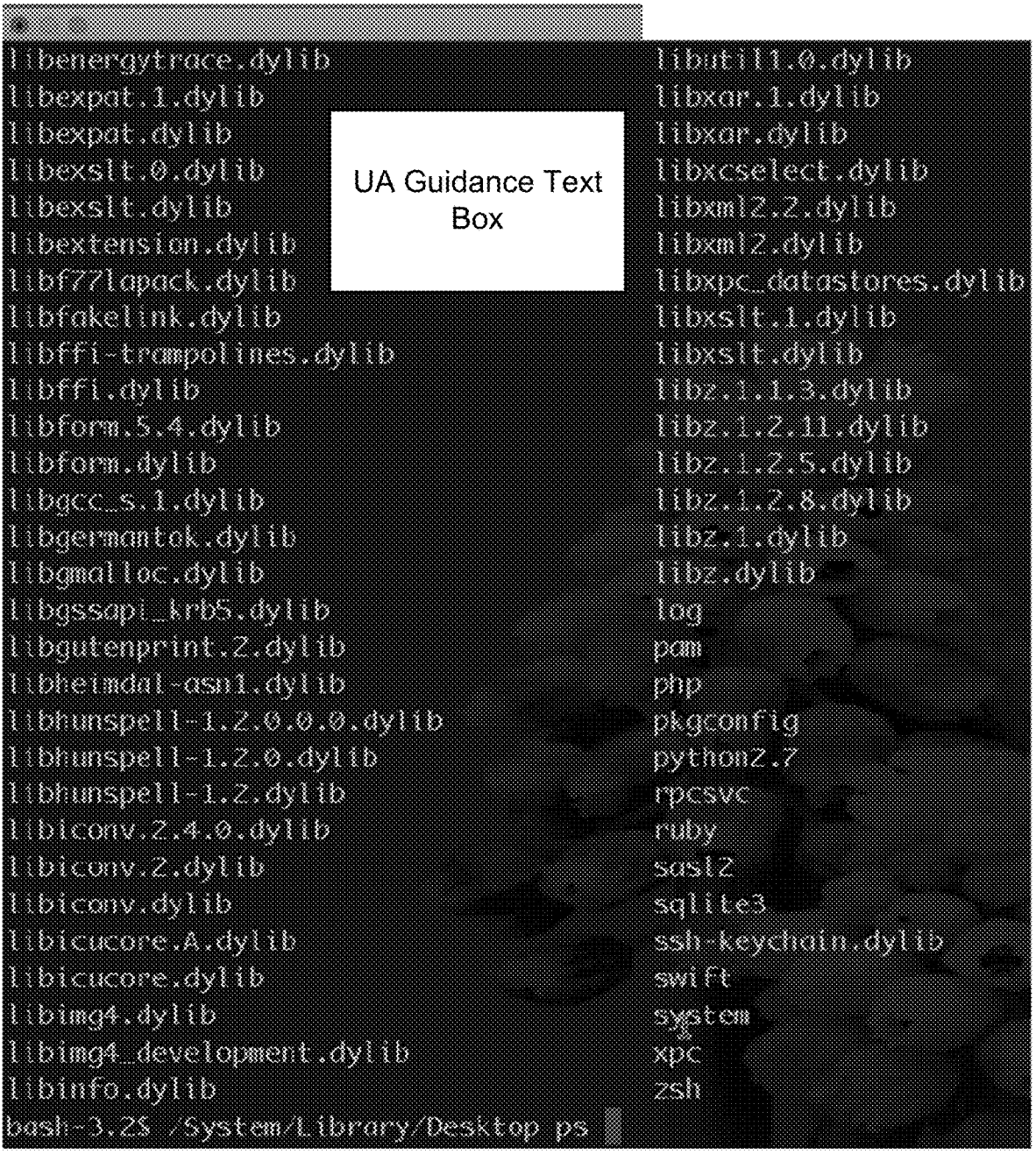
FIG. 8 shows a screen shot of a command line user interface for one system.

FIG. 8 is a simplified screen shot of a command line user interface for a terminal system. Here, the UA application may provide the following guidance for starting the system at the terminal, in a text box.

"You are using Terminal
To start the SAP system, simply type
/usr/sap/hostctrl/exe/sapcont.."

Figure 9A:
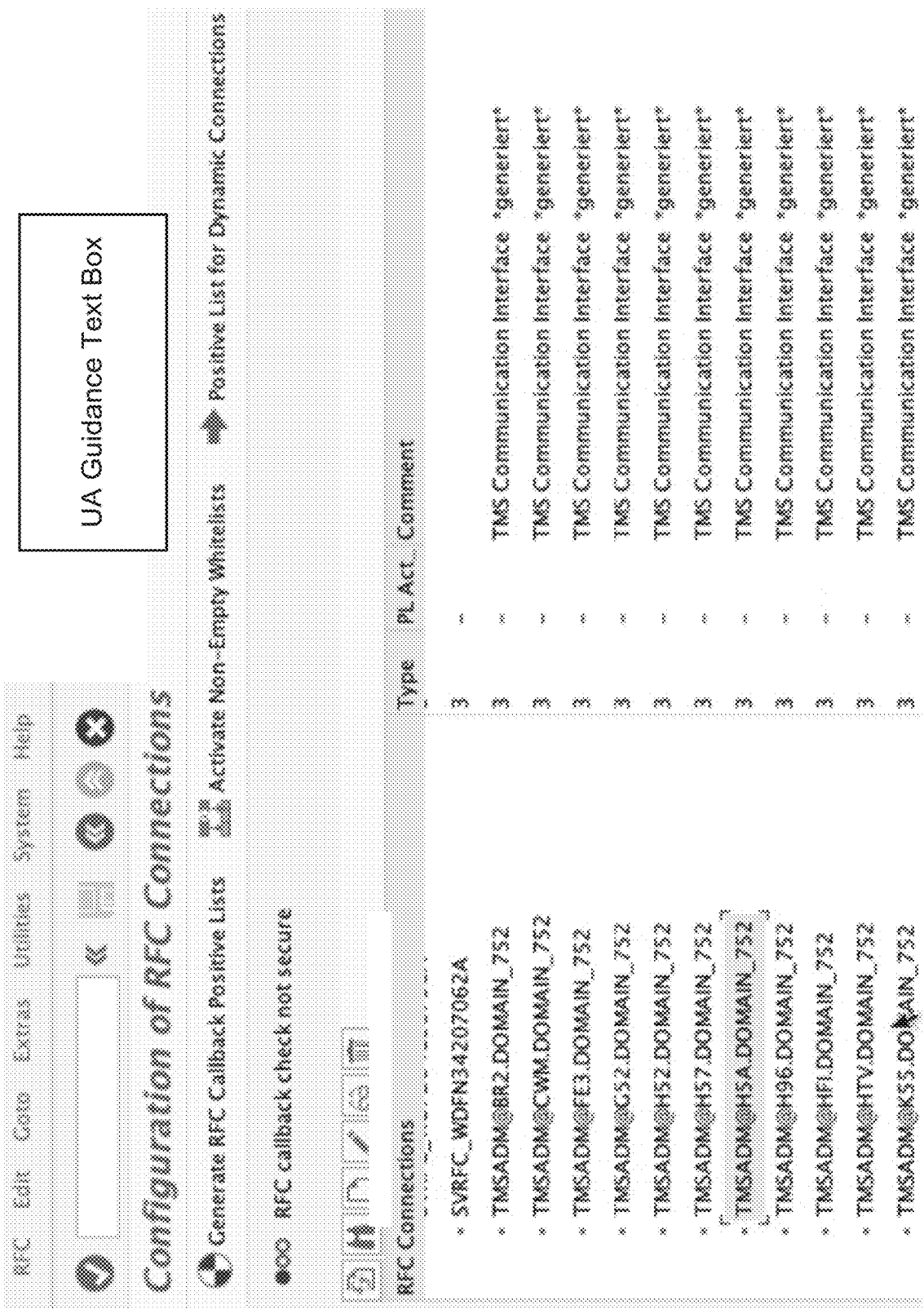
FIG. 9A shows a screen shot of a second user interface for another system.

As shown in the screenshot of FIG. 9A, in connection with the SAP SM59 interface, the UA application may provide the following guidance for display in a text box at the frontend computer.

"You are using SM59
Double-click the respective TMS destination for details."

Figure 9B:
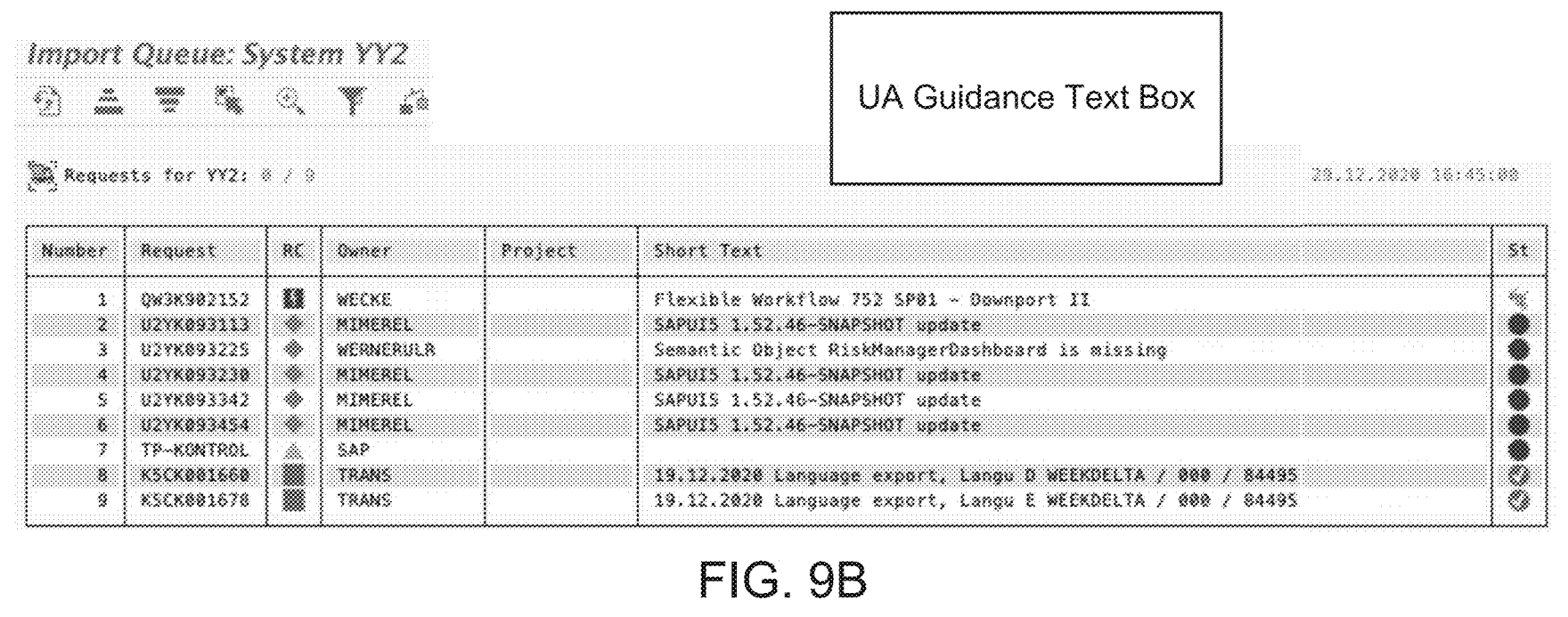

As shown in the screenshot of FIG. 9B, in connection with the SAP TMS interface, the UA application may provide the following guidance for display in a text box at the frontend computer.

"You are using STMS
If you need help importing transports, please click here"

In this manner, an active link is provided at the UI. For each of the above cases in FIGS. 7-9B, the UA guidance may be provided in a text box overlapping the UI being displayed at the frontend computer.

Embodiments of software landscape maintenance according to embodiments may offer one or more benefits. In particular, embodiments introduce user assistance supporting different tool spanning end-to-end use cases in a seamless way. That is, user interface screenshots are captured and then processed behind the scenes, with assistance then being provided to the user.

Embodiments may offer lower Total Cost of Ownership (TCO) for complex landscapes comprising multiple discrete tools for setup, maintenance, and operations. Embodiments can offer harmonized UA across different technologies and vendors.

As noted, embodiments are sensitive to particular applications and to states of those applications. This offers additional specificity in the assistance offered to users (e.g., assistance will be relevant to the particular application state).

Embodiments can provide a reduced cost of onboarding new applications within an existing landscape. Moreover, embodiments may also utilize a lightweight application occupying a small overall footprint.

Embodiments may offer a strong privacy model. That is, user data/screen captures may not leave the frontend computer.

Embodiments can offer flexibility in deployment. That is, embodiments can be deployed on a local machine or as a central service. Embodiments can support centralized and de-centralized IT setups over a variety of contexts.

Returning now to FIG. 1, there the particular embodiment is depicted with the engine responsible for user assistance as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 10:
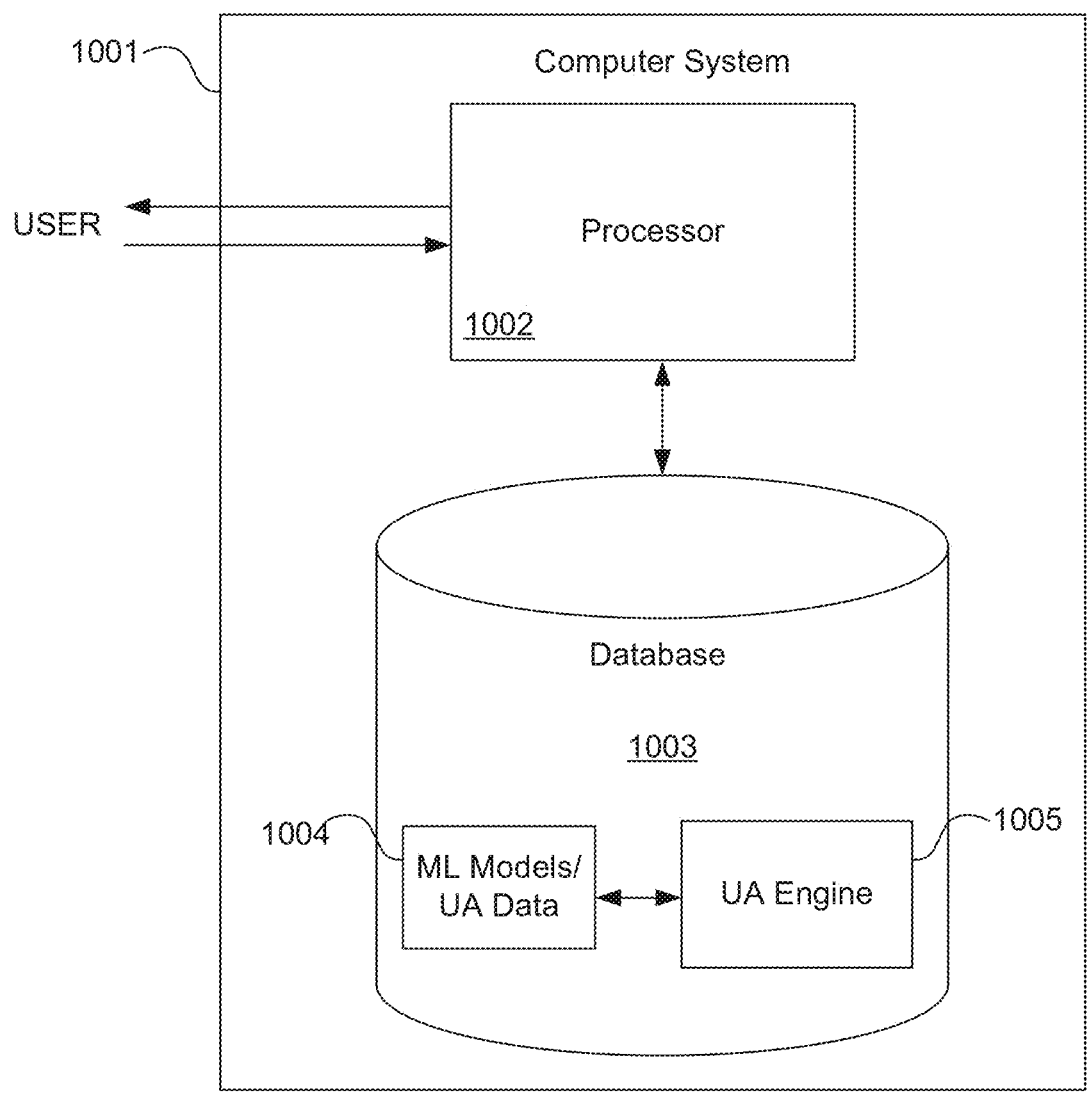
FIG. 10 illustrates hardware of a special purpose computing machine configured to implement user assistance with software landscapes according to an embodiment.

Thus FIG. 10 illustrates hardware of a special purpose computing machine configured to implement user assistance according to an embodiment. In particular, computer system 1001 comprises a processor 1002 that is in electronic communication with a non-transitory computer-readable storage medium comprising a database 1003. This computer-readable storage medium has stored thereon code 1005 corresponding to a UA engine. Code 1004 corresponds to ML models and/or UA data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer Implemented System and Methods Comprising:
capturing a first screen image from a first user interface at a frontend computer;
determining first elements from the first screen image;
processing the first elements according to a machine learning model to identify a first software application;
generating assistance data for the first software application from the first elements and the machine learning model;
persisting the assistance data in a non-transitory computer readable storage medium; and
providing the assistance data for display at the frontend computer.

Example 2. The Computer Implemented System and Method of Example 1 Further comprising:
capturing a second screen image at the frontend computer;
determining second elements from the second screen image;
generating further assistance data from the second elements and the machine learning model;
persisting the further assistance data in the non-transitory computer readable storage medium;
and
providing the further assistance data for display at the frontend computer.

Example 3. The computer implemented system and method of Example 2 wherein the second screen image is captured from the first software application.

Example 4. The computer implemented system and method of Example 2 wherein:
the first software application is a member of a landscape comprising a second software application; and
the second screen image is captured from the second software application.

Example 5. The computer implemented system and method of Examples 1, 2, 3, or 4 wherein determining the first elements occurs at the frontend computer.

Example 6. The computer implemented system and method of Examples 1, 2, 3, or 4 wherein determining the first elements occurs remote from the frontend computer.

Example 7. The computer implemented system and method of Examples 1, 2, 3, 4, or 6 wherein determining the first elements is performed by a service.

Example 8. The computer implemented system and method of Examples 1, 2, 3, 4, 5, 6, or 7 wherein:
processing the first elements identifies a state of the first software application; and the assistance data is specific to the state.

Example 9. The computer implemented system and method of Examples 1, 2, 3, 4, 5, 6, 7, or 8 wherein:
the non-transitory computer readable storage medium comprises an in-memory database; and processing the first elements is performed by an in-memory database engine of the in-memory database.

Figure 11:
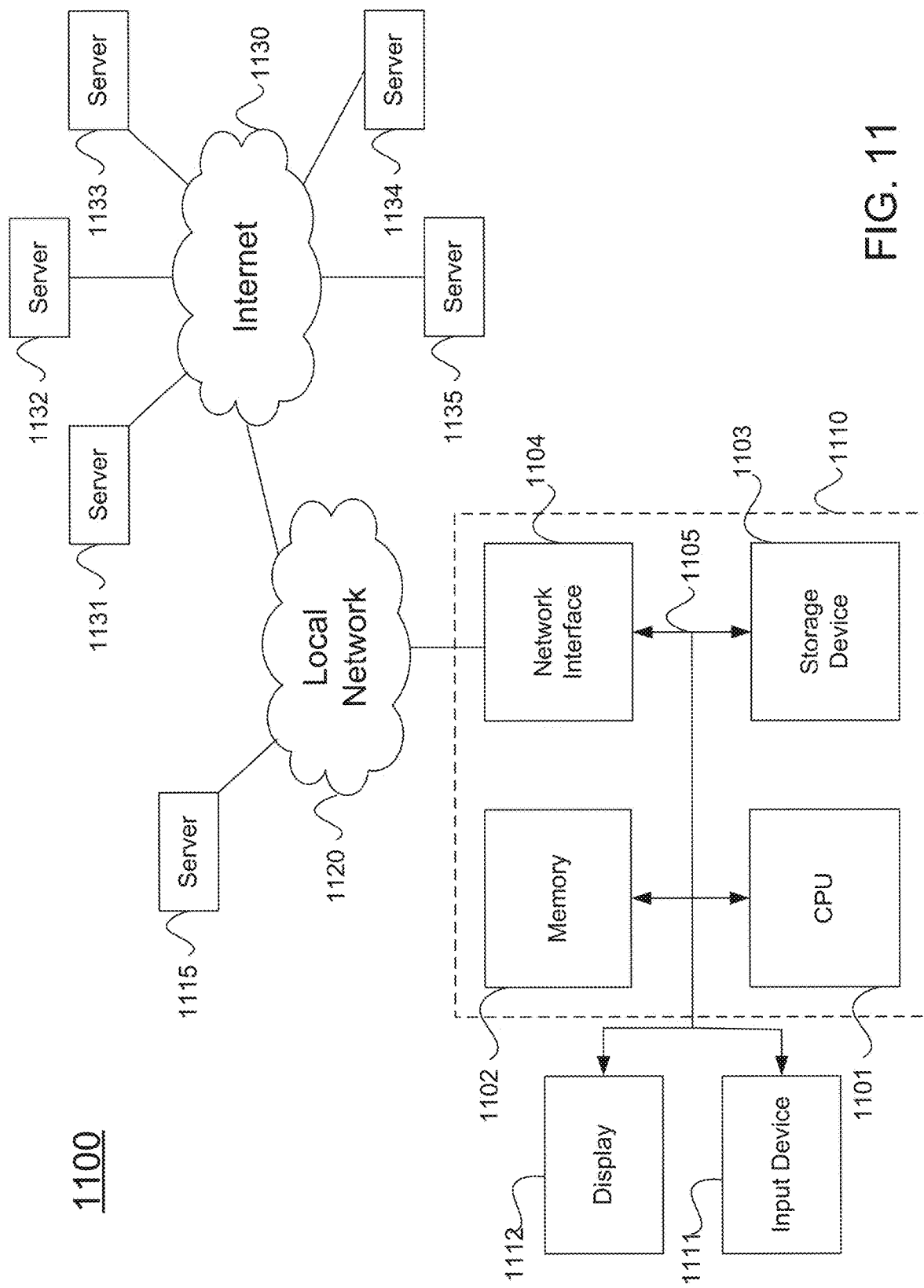
FIG. 11 illustrates an example computer system.

An example computer system 1100 is illustrated in FIG. 11. Computer system 1110 includes a bus 1105 or other communication mechanism for communicating information, and a processor 1101 coupled with bus 1105 for processing information.

Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable media.

Computer system 1110 may be coupled via bus 1105 to a display 1112, such as a Light Emitting Diode (LED) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 810 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    executing a software application in a training environment by a first user interface at a frontend computer;
    training a plurality of machine learning models by:
        utilizing the software application in the training environment by the first user interface at the frontend computer;
        capturing training data based on utilization of the software application in the training environment, wherein training data comprises a digital image of a screen of the frontend computer;
        maintaining assistance data in parallel with capturing training data;
        combining captured training data and the assistance data; and
        persisting a plurality of machine learning models trained on the combined training data and assistance data;
    capturing a first screen image from the first user interface at the frontend computer;
    determining first elements from the first screen image;
    processing the first elements for consumption by a machine learning model in the plurality of machine learning models to identify the software application;
    generating assistance data for using the first software application from the first elements and the machine learning model;
    persisting the assistance data in a non-transitory computer readable storage medium; and
    providing the assistance data for display in the first user interface at the frontend computer.

2. A method as in claim 1 wherein determining the first elements occurs at the frontend computer.

3. A method as in claim 1 wherein determining the first elements occurs remote from the frontend computer.

4. A method as in claim 1 wherein the machine learning model in the plurality of machine learning models further identifies a state of the software application.

5. A method as in claim 4 wherein the machine learning models in the plurality of machine learning models recognize specific user assistance issues corresponding to a unique combination of an identity of the software application and the state of the software application.

6. A method as in claim 1 wherein:
    processing the first elements identifies a state of the software application; and
    the assistance data is specific to the state.

7. A method as in claim 6 wherein the assistance data comprises a suggestion.

8. A method as in claim 1 wherein:
    the non-transitory computer readable storage medium comprises an in-memory database; and
    processing the first elements is performed by an in-memory database engine of the in-memory database.

9. A method as in claim 1 further comprising:
    capturing a second screen image at the frontend computer;
    determining second elements from the second screen image;
    generating further assistance data from the second elements and the machine learning model;
    persisting the further assistance data in the non-transitory computer readable storage medium; and
    providing the further assistance data for display at the frontend computer.

10. A method as in claim 9 wherein the second screen image is captured from the first software application.

11. A method as in claim 9 wherein the software application is a first software application, and wherein:
    the first software application is a member of a landscape comprising a second software application; and
    the second screen image is captured from the second software application.

12. A non-transitory computer readable storage medium embodying a computer program for performing a method, said method comprising:
    executing a software application in a training environment by a first user interface at a frontend computer
    training a plurality of machine learning models by:
        utilizing the software application in the training environment by the first user interface at the frontend computer;
        capturing training data based on utilization of the software application in the training environment, wherein training data comprises a digital image of a screen at the frontend computer;
        maintaining assistance data in parallel with capturing training data;
        combining captured training data and the assistance data; and
        persisting a plurality of machine learning models trained on the combined training data and assistance data;
    capturing a first screen image from the user interface at the frontend computer;
    determining first elements from the first screen image;
    processing the first elements for consumption by a machine learning model in the plurality of machine learning models to identify the software application;
    generating assistance data from the first elements and the machine learning model;

persisting the assistance data in a non-transitory computer readable storage medium; and providing the assistance data for display in the first user interface at the frontend computer.

13. A non-transitory computer readable storage medium as in claim 12 wherein the the machine learning model in the plurality of machine learning models further identifies a state of the software application.

14. A non-transitory computer readable storage medium as in claim 12 wherein:

the software application belongs to a landscape:

the first screen image is captured from a user interface of the software application; and the second screen image is captured from another user interface of a different software application also belonging to the landscape.

15. A non-transitory computer readable storage medium as in claim 13 wherein:

the machine learning models in the plurality of machine learning models recognize specific user assistance issues corresponding to a unique combination of an identity of the software application and the state of the software application.

16. A computer system comprising:

one or more processors;

a software program, executable on said computer system, the software program configured to cause an in-memory database engine of an in-memory database to:

execute a software application in a training environment by a first user interface at a frontend computer;

train a plurality of machine learning models by:

utilizing the software application in the training environment by the first user interface at the frontend computer;

capturing training data based on utilization of the software application in the training environment, wherein training data comprises a digital image of a screen of the frontend computer;

maintaining assistance data in parallel with capturing training data;

combining captured training data and the assistance data; and persisting a plurality of machine learning models trained on the combined training data and assistance data;

receive a screen image from the first user interface;

determine elements from the screen image;

process the elements for consumption by a machine learning model in the plurality of machine learning models to identify the software application;

generate assistance data for using the software application from the elements and the machine learning model;

persist the assistance data in the in-memory database; and provide the assistance data for display in the first user interface at the frontend computer.

17. A computer system as in claim 16 wherein the machine learning model in the plurality of machine learning models further identifies a state of the software application.

18. A computer system as in claim 16 wherein:

the user interface is on a frontend computer; and the in-memory database is local to the frontend computer.

19. A computer system as in claim 16 wherein:

the user interface is on a frontend computer; and the in-memory database is remote from the frontend computer.

20. A computer system as in claim 17 wherein the machine learning models in the plurality of machine learning models recognize specific user assistance issues corresponding to a unique combination of an identity of the software application and the state of the software application.

* * * * *